United States Patent [19]

Kazmark, Jr.

[11] Patent Number: 5,438,731
[45] Date of Patent: Aug. 8, 1995

[54] CART AND LUGGAGE HANDLE ASSEMBLY WITH AN ACTUATOR AND RELEASE APPARATUS

[75] Inventor: Eugene A. Kazmark, Jr., Joliet, Ill.

[73] Assignee: Remin Laboratories, Inc., Joliet, Ill.

[21] Appl. No.: 344,525

[22] Filed: Nov. 23, 1994

Related U.S. Application Data

[63] Continuation of Ser. No. 67,552, May 26, 1993, abandoned.

[51] Int. Cl.6 ............................................. B25G 1/04
[52] U.S. Cl. ................................................ 16/115
[58] Field of Search ............... 16/115, 110 R, 11 R, 16/111 A; 280/47.31, 47.371, 47.315, 47.17, 47.24, 655, 655.1

[56] References Cited

U.S. PATENT DOCUMENTS

| | | | |
|---|---|---|---|
| 3,572,870 | 3/1971 | Marks | 16/115 |
| 3,702,016 | 11/1972 | Keesee | 280/47.371 |
| 3,998,476 | 12/1976 | Kazmark, Sr. | 280/655 |
| 4,284,287 | 8/1981 | Esposito | 280/47.37 |
| 4,354,689 | 10/1982 | Perego | 16/115 |
| 4,523,773 | 6/1985 | Holtz | 280/654 |
| 4,577,877 | 3/1986 | Kassai | 16/115 |
| 4,754,985 | 7/1988 | Im et al. | 280/655 |
| 4,896,897 | 1/1990 | Wilhelm | 280/655 |
| 4,974,871 | 12/1990 | Mao | 280/655 |
| 5,127,664 | 7/1992 | Cheng | 280/655 |
| 5,178,404 | 1/1993 | Chen | 280/655.1 |

*Primary Examiner*—Mark Rosenbaum
*Assistant Examiner*—Chuck Y. Mah
*Attorney, Agent, or Firm*—Tilton, Fallon, Lungmus & Chestnut

[57] ABSTRACT

A handle assembly for carts and wheeled luggage includes a pair of tube assemblies disposed in substantially parallel relation and connected by a handle member. The tube assemblies carry lock buttons which cooperate with an actuator and release assembly to releasably lock the tube assemblies in an extended or retracted position.

14 Claims, 2 Drawing Sheets

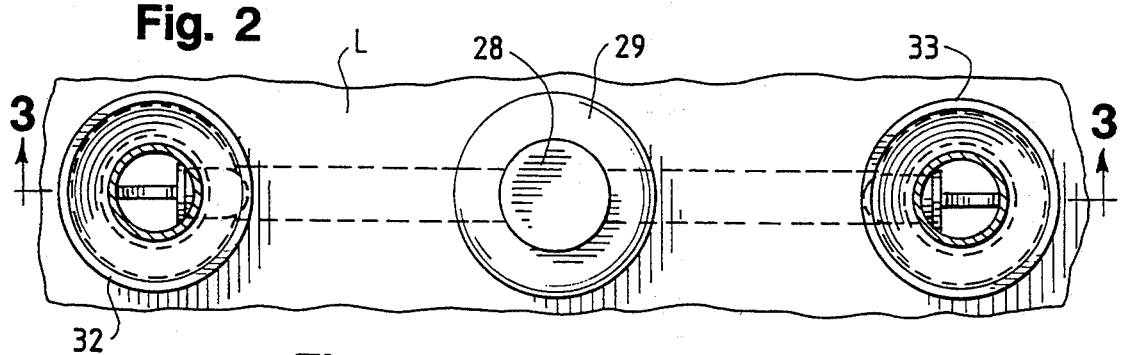
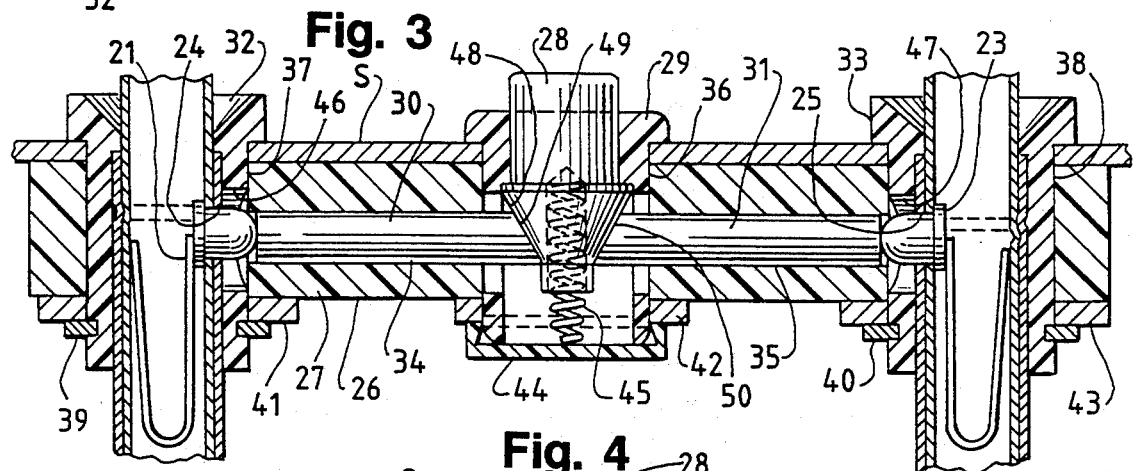
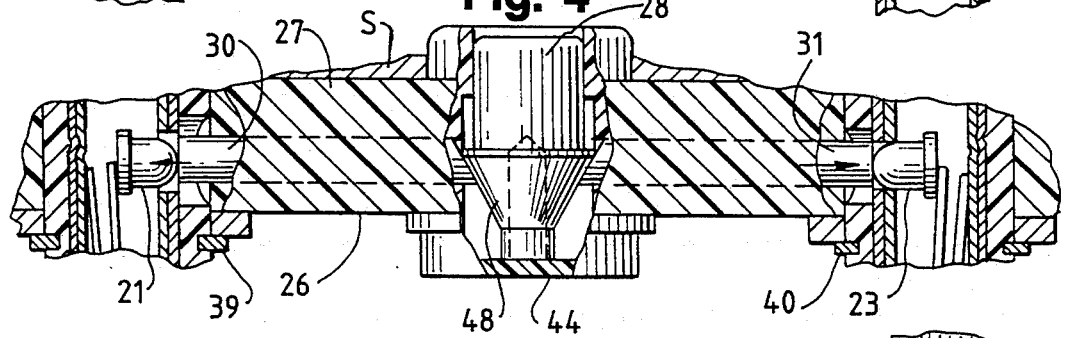
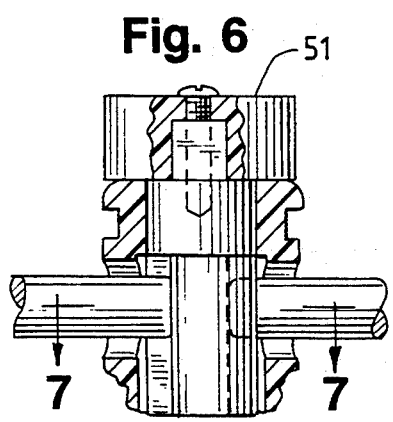
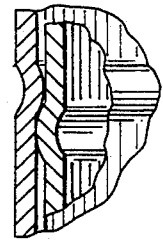
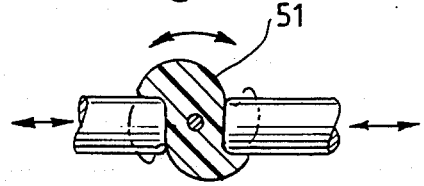

CART AND LUGGAGE HANDLE ASSEMBLY WITH AN ACTUATOR AND RELEASE APPARATUS

This is a continuation of application Ser. No. 08/067,552, filed May 26, 1993, now abandoned.

BACKGROUND OF THE INVENTION

FIELD OF THE INVENTION

The present invention relates to a handle assembly for portable luggage carts or wheeled luggage and more particularly to a handle assembly which includes a pair of telescoping tube assemblies that carry lock buttons for releasably securing the tubes of the tube assemblies in an extended or retracted position and an actuator and release apparatus for releasing the lock buttons.

DESCRIPTION OF THE PRIOR ART

The prior art includes a wide variety of luggage carriers or carts and wheeled luggage with telescoping and collapsible handle assemblies. The portable luggage carrier described in Kazmark, Sr. U.S. Pat. No. 3,998,476 includes a handle assembly comprising a pair of collapsible and telescoping tube assemblies. The lower ends of the intermediate and upper tubes carry lock buttons which extend through openings in the upper ends of the lower and intermediate tubes to releasably lock the tubes in an extended position. A pair of upper and lower release bars which extend between the tube assemblies adjacent the upper ends of the lower tubes release the lock buttons.

The release bars of the luggage carrier described above provide easy release of the lock buttons. However, this arrangement does not lend itself to installation in wheeled luggage.

The handle assembly of the present invention includes an actuator and release apparatus which cooperates with lock buttons carried by the assembly tubing to allow a user to place and lock the assembly in an extended or retracted position. The assembly is a simple construction which minimizes the expense of manufacture and assembly and provides quick and effective operation.

SUMMARY OF THE INVENTION

In accordance with one embodiment of the present invention, a handle assembly for wheeled carts or luggage includes at least one tube assembly with first and second tubes. The first tube extends into the second tube in telescoping relation with the second tube. Latching means including a spring-loaded lock button disposed in the first tube extends through an opening in the first tube to lock the first tube in a predetermined position and prevent relative sliding movement between the first tube and the second tube. Actuating means disposed a predetermined distance outwardly of the first and second tubes unlocks the latching means to allow sliding movement between the first and second tubes. Linking means disposed between the actuating means and the latching means transmits an unlatching or unlocking force from the actuating means to the latching means.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 2 is a plan view of a portion of the wheeled luggage through which the handle assembly of the present invention extends;

FIG. 3 is a sectional view taken along line 3—3 in FIG. 2 and showing a push button actuator in a raised position;

FIG. 4 is the sectional view of FIG. 3 showing the push button actuator in a depressed position;

FIG. 5 is a sectional view showing stops formed in the upper and lower tubes of a tube assembly of the present invention;

FIG. 6 is a sectional view showing an alternative actuator; and

FIG. 7 is a sectional view taken along line 7—7 in FIG. 6.

Figure 1:
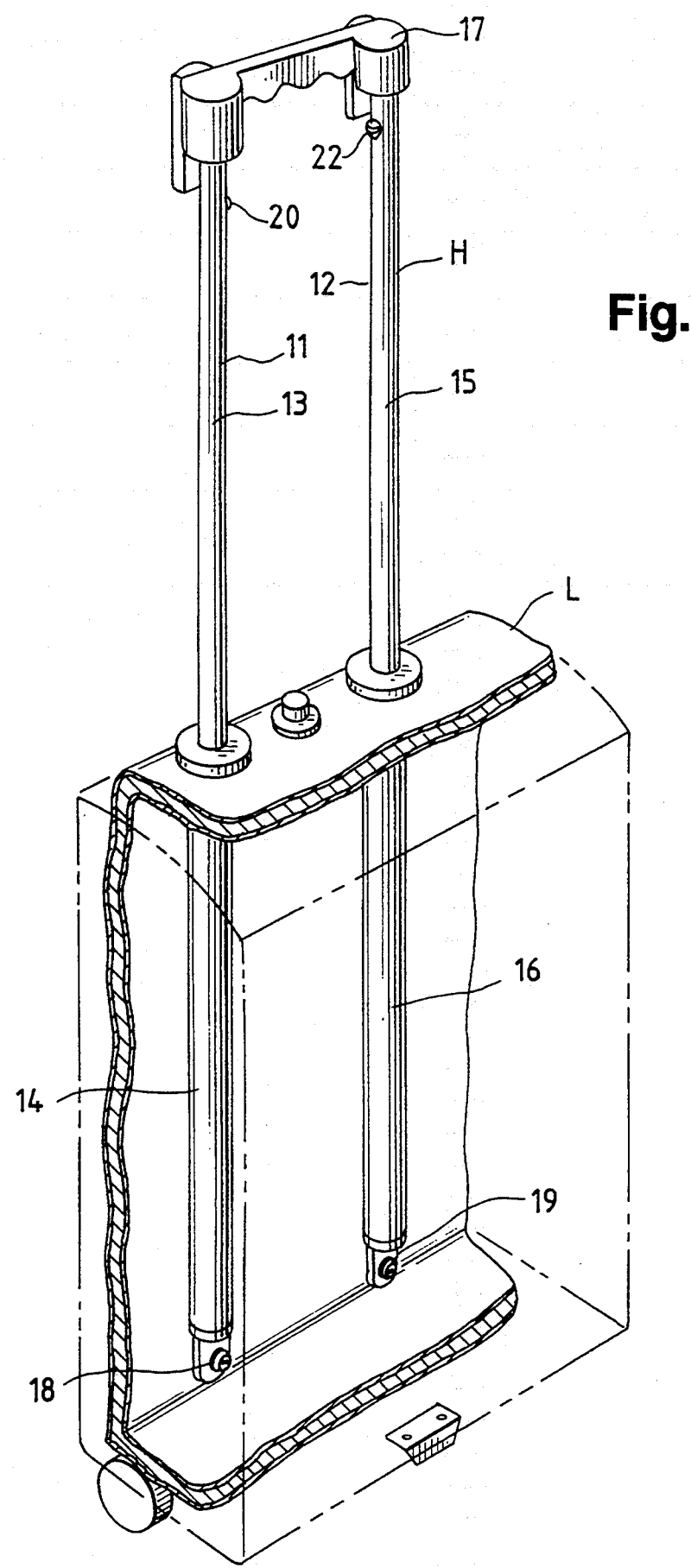
FIG. 1 is a perspective view of the handle assembly of the present invention secured to a piece of wheeled luggage with a portion of the luggage cut away to show the portion of the assembly disposed within the luggage.

While the following disclosure describes the invention in connection with one embodiment and a modification one should understand that the invention is not limited to this embodiment. Furthermore, one should understand that the drawings are not to scale and that graphic symbols, diagrammatic representations, and fragmentary views, in part, illustrate the embodiment. In certain instances, the disclosure may not include details which are not necessary for an understanding of the present invention such as conventional details of fabrication and assembly.

DETAILED DESCRIPTION OF THE DRAWINGS AND AN EMBODIMENT

Turning now to the drawings, FIG. 1 shows the handle assembly H of the present invention secured to a piece of wheeled luggage L. The luggage L may be any one of a wide variety of commercially available products. In addition, although the handle assembly of the present invention finds particular utility in wheeled luggage, it may also serve as a handle assembly in two-wheeled carts or other similar devices.

The handle assembly H includes a pair of telescoping tube assemblies 11 and 12 disposed in parallel relation and secured to the bottom of the luggage L as shown in FIG. 1 and at the top of the luggage as shown in FIGS. 3 and 4. The assembly 11 includes a first tube 13 and a second tube 14. The assembly 12 includes a third tube 15 and a fourth tube 16. The lower tubes 14 and 16 are round tubes; and the tube 14 has the same length and inside and outside diameter as the tube 16. The tubes 14 and 16 receive the upper tubes 13 and 15 which are also round and which have an outside diameter smaller than the inside diameter of the tubes 14 and 16. The tube 13 has the same length, inside diameter, and outside diameter as the tube 15. (The tubes are made of aluminum, stainless steel or any other suitable material. In addition, although the embodiment shown includes round tubes, the tubes may have a square configuration, a generally rectangular configuration, or any other suitable cross-sectional configuration.)

A handle member 17 made out of hard plastic or any other material of high strength and rigidity lies fixedly secured to the top ends of the tubes 13 and 15. Alternatively, the tubes 13 and 15 and the handle 17 may be a one-piece, integrally formed unit. Tabs 18 and 19 lie fixedly secured to end portions of the tubes 14 and 16, respectively, and to the luggage L. These tabs 18 and 19 and handle member 17 prevent rotation of the upper tubes 13 and 15 and the lower tubes 14 and 16 to facilitate locking and unlocking the tube assemblies in predetermined positions as described below.

The tube 13 carries a spring-loaded lock button 20 (including a spring portion and a button portion) at its top end (See FIG. 1) and another such button 21 at its button end (See FIGS. 3 and 4). Similarly, the tube 15 carries a spring-loaded lock button 22 at its top end and one 23 at its bottom end (See FIGS. 3 and 4).

As shown in FIGS. 3 and 4, the lock buttons 20-23 extend through corresponding openings in the tubes 13 and 15. The buttons 20 and 22 also extend through openings 24 and 25 defined by tubes 14 and 16, respectively, when the handle assembly H lies in a retracted position (not shown) to lock the assembly in that position. Furthermore, the buttons 21 and 23 extend through the openings 24 and 25 (as shown in FIGS. 3 and 4) when the handle assembly lies in an extended position or mode (as shown in FIG. 1) to lock the assembly in that position. Stops such as those shown in FIG. 5 limit the movement of the tubes 13 and 15 inwardly and outwardly of the tubes 14 and 16. At one limit, the buttons 20 and 22 lie in alignment with the openings 24 and 25; and at the opposite limit the buttons 21 and 23 lie in alignment with the openings 24 and 25.

An actuator and release assembly 26, secured to the shell S of the luggage L and disposed between the tube assemblies 11 and 12 at the top ends of the tubes 14 and 16, releases the lock buttons to allow a use to move the handle assembly from one mode to another. The assembly 26 generally includes a main member 27, a plunger 28, a grommet 29 for receiving the plunger 28, a pair of linking rods 30 and 31, a grommet 32 through which the tube assembly 11 extends and a grommet 33 through which the tube assembly 12 extends. The main member 27 lies perpendicularly of the tube assemblies 11 and 12, defines bores 34 and 35 for the rods 30 and 31, respectively, an opening 36 for the grommet 29, an opening 37 for the grommet 32, and an opening 38 for the grommet 33.

A locking ring 39 disposed around the grommet 32 and a locking ring 40 disposed around the grommet 33 secure the assembly 26 to the shell S. Spacers 41, 42 and 43 disposed around grommets 32, 29 and 33, respectively, allow the installation of the assembly 26 on a variety of luggage with varying shell thickness. Finally, a cap 44 covers the bottom of the grommet 29 and acts as a support for the plunger 28 and a spring 45 which biases the plunger 28 in the position shown in FIG. 3.

The linking rod 30 lies in sliding engagement with the member 27 in the bore 34. It moves back and forth in the bore 34 and in a slot 46 of the grommet 32. It engages the lock bottoms of the tube assembly 11 at one of its ends to release them. Similarly, the linking rod 31 lies in sliding engagement with the member 27 in the bore 35. It moves back and forth in the bore 35 and in a slot 47 of the grommet 33. It engages the lock buttons of the tube assembly 12 at one of its ends to release them.

The plunger 28 lies between the rods 30 and 31. It includes a frustoconical camming surface 48 which engages inclined camming surface 49 on the rod 30 and inclined camming surface 50 on the rod 31. A downward push of the plunger 28 with a force of a magnitude sufficient to overcome the force of the spring 45 drives the rods 30 and 31 outwardly of the plunger 28 until the rods engage the lock buttons of the tubes 13 and 15 and push them into those tubes (See FIG. 4). Thus, the rods 30 and 31 release the lock buttons to allow sliding movement between the tubes of the tube assemblies. Upon release of the plunger 28, the spring 45 moves the plunger to the raised position shown in FIG. 3; and the springs of the lock buttons move the rods 30 and 31 back to the positions shown in FIG. 3.

Alternatively, a rotating actuator 51 shown in FIGS. 6 and 7 may replace the plunger 28. In this arrangement, the actuator 51 acts as a cam and the two rods 30 and 31 as cam followers. Clockwise rotation of the actuator shown in FIG. 7 produces outward displacement of the rods 30 and 31.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A handle assembly for wheeled carts or luggage, said assembly comprising:
   (a) first and second tubes, the first tube extending into the second tube in telescoping relation with the second tube;
   (b) latching means disposed in one of the tubes for locking the first in a predetermined position relative to the second tube;
   (c) actuating means disposed a predetermined distance outwardly of the first and second tubes for unlatching the latching means to allow sliding movement between the first and second tubes; and
   (d) linking means disposed generally perpendicularly to the tubes between the actuating means and the tubes for reciprocating, sliding movement and for transmitting an unlatching force from the actuating means to the latching means;
   the latching means and the linking means being separate members, the linking means being moveable in a generally perpendicular direction to the longitudinal axes of the first and second tubes, and the actuating means driving the linking means towards the latching means without pulling the linking means in the opposite direction.

2. The assembly of claim 1, wherein the latching means includes a spring-loaded button member which extends through openings in the first tube to lock the two tubes together at predetermined positions of the tubes.

3. The assembly of claim 2, wherein the latching means includes a plurality of spring-loaded button members.

4. The assembly of claim 1, further comprising a housing member for supporting the actuating means and the linking means.

5. The assembly of claim 4, wherein the linking means includes an elongate rod disposed in sliding relation with the housing member.

6. The assembly of claim 5, wherein the actuating means includes a reciprocating plunger and a plunger spring for biasing the plunger to a predetermined position, the plunger having a camming surface and the linking means having a camming surface which cooperates with a camming surface on the plunger, the linking means moving towards the tubes to unlatch the latching means in response to movement of the plunger.

7. The handle assembly of claim 4, wherein the actuating means includes a rotatable member with a camming surface which cooperates with a camming surface on the linking means, the linking means moving towards the tubes to unlatch the latching means in response to rotation of the rotatable member.

8. A handle assembly for wheeled carts or luggage, said assembly comprising:
   (a) a first tube assembly including first and second tubes, the first tube extending into the second tube in telescoping relation with the second tube;
   (b) a second tube assembly including third and fourth tubes, the third tube extending into the fourth tube in telescoping relation with the fourth tube;
   (c) said first and second tube assemblies disposed in substantially parallel relation;
   (d) latching means disposed in the first and second tube assemblies for locking one tube of each assembly relative to the other tube;
   (e) a housing member disposed between the first and second tube assemblies;
   (f) actuating means supported by the housing member a predetermined distance from the first tube assembly and a predetermined distance from the second tube assembly for unlatching the latching means to allow sliding movement between the tubes of each assembly; and
   (g) linking means supported by the housing member for transmitting an unlatching force from the actuating means to the latching means, said linking means being disposed generally perpendicularly to the first and second tube assemblies for reciprocating, sliding movement between the actuating means and tube assemblies;
   the latching means and the linking means being separate members, the linking means being moveable in a generally perpendicular direction to the longitudinal axes of the first and second tubes, and the actuating means driving the linking means towards the latching means without pulling the linking means in the opposite direction.

9. The handle assembly of claim 8, wherein the latching means includes a spring-loaded button member for each tube assembly, the button members extending through openings in the tubes of the tube assemblies to lock the tubes of each tube assembly together at predetermined positions.

10. The handle assembly of claim 9, wherein the latching means includes a plurality of spring-loaded button members in each of the first and third tubes.

11. The handle assembly of claim 8, wherein the linking means includes a pair of elongate rods disposed on opposite sides of the actuating means in sliding relation with the housing member.

12. The handle assembly of claim 11, wherein the actuating means includes a reciprocating plunger and a plunger spring for biasing the plunger to a predetermined position, the plunger having a camming surface and the rods having a camming surface which cooperates with a camming surface on the plunger, the rods moving towards the tubes to unlatch the latching means in response to movement of the plunger.

13. The handle assembly of claim 8, wherein the actuating means includes a rotatable member with a camming surface which cooperates with a camming surface on the rods, the rods moving towards the tubes to unlatch the latching means in response to rotation of the rotatable member.

14. A handle assembly for wheeled carts or luggage, said assembly comprising:
   (a) a first tube assembly including first and second tubes, the first tube extending into the second tube in telescoping relation with the second tube; tubes, the third tube extending into the fourth tube in telescoping relation with the fourth tube;
   (b) a second tube assembly including third and fourth
   (c) said first and second tube assemblies disposed in substantially parallel relation;
   (d) latching means disposed in the first and second tube assemblies for looking one tube of each assembly relative to the other tube;
   (e) a support member disposed between the first and second tube assemblies;
   (f) actuating means supported by the support member a predetermined distance from the first tube assembly and a predetermined distance from the second tube assembly for unlatching the latching means to allow sliding movement between the tubes of each assembly; and
   (g) linking means supported by the housing member for transmitting an unlatching force from the actuating means to the latching means, said linking means being disposed generally perpendicularly to the tube assemblies for reciprocating, sliding movement between the actuating means and tube assemblies;
   the latching means and the linking means as being separate members, the linking means being moveable in a generally perpendicular directions to the longitudinal axes of the first and second tubes, and the actuating means driving the linking means towards the latching means without pulling the linking means in the opposite direction;
   said actuating means including a plunger for reciprocating movement generally parallel to the tube assemblies and a plunger spring for biasing the plunger to a predetermined position, said plunger engaging the linking means in sliding unfastened relation and pushing the linking means into contact with the latching means to release the latching means.

* * * * *

UNITED STATES PATENT AND TRADEMARK OFFICE
CERTIFICATE OF CORRECTION

PATENT NO. : 5,438,731
DATED : August 8, 1995
INVENTOR(S) : Eugene A. Kazmark, Jr.

It is certified that error appears in the above-indentified patent and that said Letters Patent is hereby corrected as shown below:

Claim 14, column 6, line 19, delete "tubes,".

Claim 14, column 6, line 20, delete "the third tube extending into the fourth tube in".

Claim 14, column 6, line 21, delete "telescoping relation with the fourth tube;".

Claim 14, column 6, line 22, after "fourth" insert -- tubes, the third tube extending into the fourth tube in telescoping relation with the fourth tube; --.

Signed and Sealed this

Tenth Day of October, 1995

*Attest:*

BRUCE LEHMAN

*Attesting Officer*  *Commissioner of Patents and Trademarks*